(12) United States Patent
Benali

(10) Patent No.: US 9,788,566 B2
(45) Date of Patent: Oct. 17, 2017

(54) PROCESS FOR DRYING AND POWDERIZING FUNCTIONAL FOODS, NUTRACEUTICALS, AND NATURAL HEALTH INGREDIENTS

(71) Applicant: Her Majesty the Queen in Right of Canada as Represented by the Minister of Natural Resources, Ottawa (CA)

(72) Inventor: Marzouk Benali, Mont-Saint-Hilaire (CA)

(73) Assignee: Her Majesty the Queen in Right of Canada as Represented by the Minister of Natural Resources (CA)

( * ) Notice: Subject to any disclaimer, the term of this patent is extended or adjusted under 35 U.S.C. 154(b) by 0 days.

(21) Appl. No.: 14/902,901

(22) PCT Filed: Jan. 27, 2014

(86) PCT No.: PCT/CA2014/000055
§ 371 (c)(1),
(2) Date: Jan. 5, 2016

(87) PCT Pub. No.: WO2015/109384
PCT Pub. Date: Jul. 30, 2015

(65) Prior Publication Data
US 2016/0331005 A1    Nov. 17, 2016

(51) Int. Cl.
*F26B 3/12* (2006.01)
*B01D 1/18* (2006.01)
(Continued)

(52) U.S. Cl.
CPC ............ *A23L 3/46* (2013.01); *A23P 10/40* (2016.08); *B01D 1/18* (2013.01); *B01D 1/20* (2013.01);
(Continued)

(58) Field of Classification Search
CPC ........ F26B 3/205; F26B 3/0926; F26B 3/088; F26B 3/12; A23L 3/46; B01D 1/20; B01D 1/18; A23P 10/40; A23V 2002/00
See application file for complete search history.

(56) References Cited

U.S. PATENT DOCUMENTS
3,231,413 A    1/1966  Berquin
4,117,801 A    10/1978 Danneli et al.
(Continued)

FOREIGN PATENT DOCUMENTS
CA    2178575        12/1997
EP    0974385 A1    1/2000
WO    03037303 A1   5/2003

OTHER PUBLICATIONS
International Search Report for PCT/CA2014/000055, dated Jun. 6, 2014, 6 pages.
(Continued)

*Primary Examiner* — Jessica Yuen
(74) *Attorney, Agent, or Firm* — Hoffman Warnick LLC

(57) ABSTRACT

A system for producing free-flowing powder with a narrow particle size distribution from liquid compositions comprising in combination: a feeding reservoir comprising said liquid compositions: a pumping device to pump said liquid composition into at least one atomizing device: said at least one atomizing device composed of at least one fluid nozzle to distribute an upward gaseous drying medium over said nozzle: two lateral streamlined tube-like devices for supplying said liquid composition and pressurized gas to said at least one nozzle from two opposite directions: a cylindrical plenum chamber wherein the fluid nozzle is located: an accelerating zone of a drying medium consisting of a cylindrical pipe located at the bottom of the cylindrical plenum: a conical-cylindrical drying chamber equipped with a manhole, a multi-nozzle manifold and insulation panels: and an intermediate drying medium consisting of a single bed or multi-beds of inert carriers within the drying chamber.

18 Claims, 8 Drawing Sheets

(51) Int. Cl.

| | | |
|---|---|---|
| *B01D 1/20* | (2006.01) | |
| *A23L 3/46* | (2006.01) | |
| *A23P 10/40* | (2016.01) | |
| *F26B 3/088* | (2006.01) | |
| *F26B 3/092* | (2006.01) | |
| *F26B 3/20* | (2006.01) | |

(52) U.S. Cl.
CPC ............ *F26B 3/088* (2013.01); *F26B 3/0926* (2013.01); *F26B 3/12* (2013.01); *F26B 3/205* (2013.01); *A23V 2002/00* (2013.01)

(56) References Cited

U.S. PATENT DOCUMENTS

| | | |
|---|---|---|
| 5,040,310 A | 8/1991 | Huttlin |
| 5,809,664 A | 9/1998 | Legros et al. |
| 2005/0050761 A1 | 3/2005 | Benali et al. |
| 2013/0126102 A1 | 5/2013 | Kitamura et al. |

OTHER PUBLICATIONS

EP Search Report and Opinion for EP Application No. 14879660.0 dated Mar. 2, 2017, 5 pages.

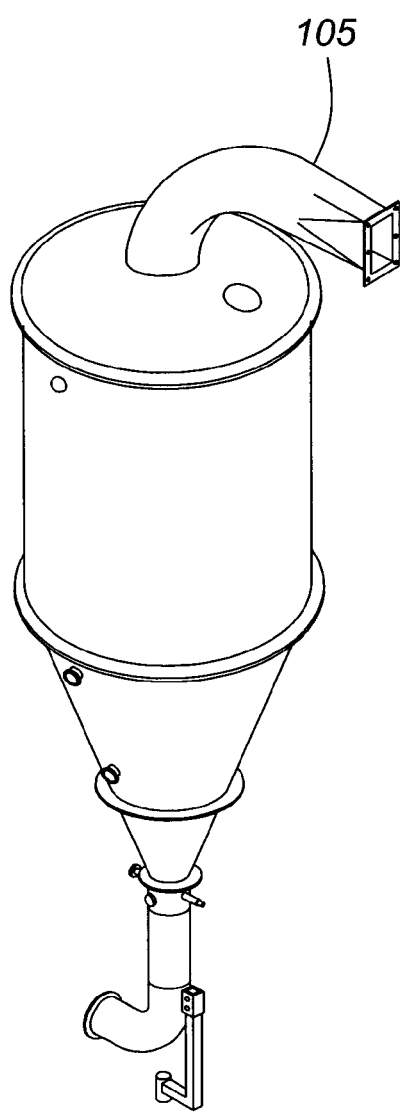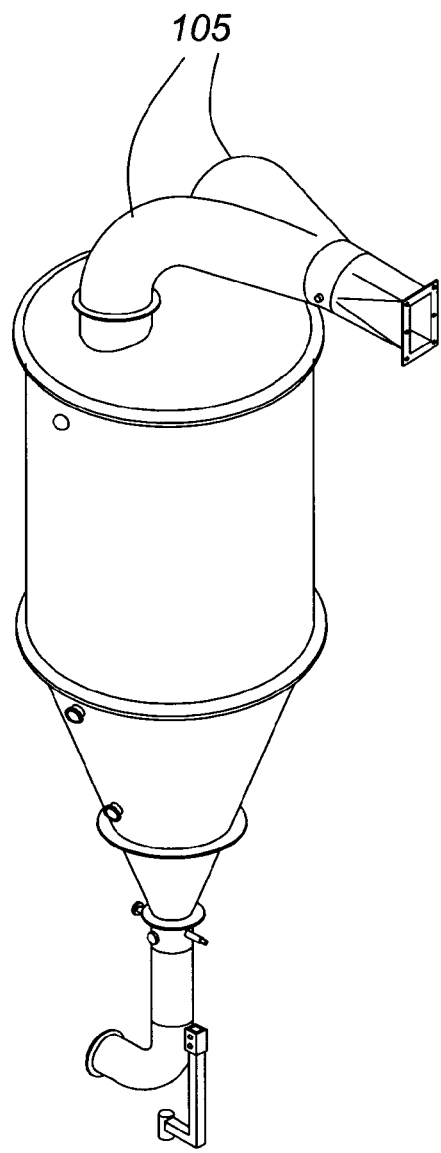
FIG. 2  FIG. 3

PROCESS FOR DRYING AND POWDERIZING FUNCTIONAL FOODS, NUTRACEUTICALS, AND NATURAL HEALTH INGREDIENTS

FIELD OF THE INVENTION

The present invention relates to the process for drying and powderizing of functional foods, nutraceuticals, and natural health ingredients including liquid solutions, suspensions or dispersions, in a conical-cylindrical drying chamber.

BACKGROUND OF THE INVENTION

The challenge for drying and powderizing functional foods, nutraceuticals, and natural health ingredients is to efficiently produce free-flowing powdery products, while maintaining a high level of bioactive functionality of said products.

Traditionally, spray drying is a technique which has been used mainly in the food and pharmaceutical industries to produce powders from liquid solutions, suspensions or dispersions. Typically, the liquids to be spray-dried are atomized into small droplets, and fed at the top of a tall tower through which hot air is passed concurrently or counter-currently. Proper atomization of the feed is of prime importance for efficient drying.

Three basic feed devices are used extensively in the industry: (a) single fluid nozzle or pressure type, (b) two-fluid nozzle or pneumatic type, and (c) spinning disc, though other techniques such as pulse combustion or ultrasonic dispenser are also used in certain applications.

Even though such a spray drying process has successfully been used over 60 years, its economic viability is still problematic and present challenges for a daily production less than 1000 kg of powdery biomaterials, mainly due to the large size of the equipment.

Freeze drying (i.e., lyophilisation) is another well-established technique to process biological materials, pharmaceuticals, and functional foods, which can previously be frozen. Freeze dryers commonly include a freeze drying chamber, shelves in this chamber for holding the material to be freeze-dried, a condenser, a vacuum system, and fluid pipes for connecting the various freeze dryer components. Generally, the freeze dryer shelves are cooled and heated during the freeze drying cycle with cooling and heating devices. In such dryers, the water or the organic solvent within the frozen material to be processed is removed as a vapour by sublimation from the frozen material placed in a vacuum chamber. After the frozen water or the organic solvent sublimes directly to a vapour, the freeze-dried product is removed from the shelves. The freeze-dried products are usually in a crystalline form requiring a post-processing step such as milling and sieving. One of the key advantages of freeze drying is no thermally-induced product degradation such as denaturation or modification of functionality properties of the freeze-dried product.

However, there remain drawbacks for both the traditional spray drying and freeze drying processes.

For example, spray dryers generally operate at high temperature (typically 120-250° C. for heat-sensitive biomaterials). As such, the biomaterials are exposed to a high shear stress which can affect the stability of the macro and micro molecules in complex biomaterials (for example, proteins, flavonoids polysaccharides, etc.). There is also the adhesion of a dried product to the dryer walls due to their fine powder form when dry, and the stickiness phenomenon related to moisture content and material temperature. This adhesion issue adds cost for cleaning and leads to production losses. Additionally, the size of the drying chamber and the related ancillary equipment (e.g., high pressure atomizing device, powder collector, etc.) are large in size which increases the investment costs.

On the other hand, freeze dryers have long processing time (typically, from 12 to 24 hours per cycle, which translates into high operating costs) and high energy consumption (by 2 to 4 times higher than the other drying techniques). In addition, post-processing of dried products is required to obtain a desired size of the powder which also results in high investment costs (typically, from 3 to 6 times higher than spray dryers).

Therefore, there is still a need for an efficient and cost-effective drying to obtain powdery functional foods, nutraceuticals, and natural health ingredients.

There exist prior art references which disclose the use of an atomizing device or process and the use of spraying method.

For example, Canadian Patent 2,394,127 generally discloses the technique forming a hollow cone of liquid, the device comprising a housing into which a first medium in the form of a liquid to be atomized can be supplied, the housing comprising an outflow end and an insert piece with a guide end that interacts with an outflow end of the housing, thereby forming an annular outflow gap. Canadian Patent Application 2,021,970 generally discloses an air atomization paint spray gun. U.S. Pat. No. 4,361,965 generally discusses a device for atomizing a reaction mixture, said device enabling the reaction mixture to be atomized in a reactor with the aid of at least a first gas and an atomizing nozzle. U.S. Pat. No. 8,313,704 generally discloses a spouted bed device having a conical baffle which has an outside diameter that increases progressively downward, is closed at a top end thereof, and has a bottom end that is spaced apart from an inside wall of the cylinder, wherein the conical baffle is disposed at a position which is below and opposed to a bottom end of the tubular portion of the treatment zone. U.S. Pat. No. 4,896,436 generally discloses a spray drying process and the apparatus, and provides a spray drying apparatus of integration type wherein several spray drying chambers are accommodated in a common housing.

However, it will be apparent to a person skilled in the art that none of the known patents and prior art revealed in technical literature discloses all features of the present invention, inter alia, the atomizing device, a conical-cylindrical drying chamber and the use of inert carriers.

SUMMARY OF THE INVENTION

The present invention aims at solving the existing problems in the prior art by efficient production in a continuous manner, free-flowing powdery products, while maintaining a high level of the bioactive functionality of said products.

This is achieved by simultaneously shortening the residence time of the materials to be processed in the drying chamber while increasing the contact surface area between the gaseous drying medium and the materials to be processed, thus downsizing the volume of the drying chamber.

In accordance with one aspect of the present invention, there is provided a system for producing free-flowing powder with a narrow particle size distribution from liquid solutions or liquid suspensions or liquid dispersions of functional foods, nutraceuticals, and natural health ingredients comprising in combination:

(a) a feeding reservoir equipped with an agitator to maintain homogenous liquid compositions of said liquid solutions or liquid suspensions or liquid dispersions;

(b) a positive displacement pumping device to pump said liquid composition into at least one atomizing device;

(c) said at least one atomizing device composed of:
  (i) at least one fluid nozzle fitted at its bottom with a body in the shape of a truncated cone to distribute an upward gaseous drying medium over said nozzle;
  (ii) a optional micrometric tool to vertically adjust the position of the said fluid nozzle;
  (iii) at least two lateral streamlined tube-like devices for accelerating and directing said fluid or liquid suspensions in two opposite directions;
  (iv) a cylindrical plenum chamber wherein the fluid nozzle is located;
  (v) an accelerating zone of a drying medium consisting of a cylindrical pipe located at the bottom of the cylindrical plenum and having a length equivalent to at least five times the diameter of the inlet of the said cylindrical plenum chamber;

(d) a conical-cylindrical drying chamber sustaining a temperature of a gaseous drying medium at 250° C. and above equipped with a manhole, a multi-nozzle manifold and optionally removable insulation panels; and (e) an intermediate drying medium consisting of a single bed or multi-beds of inert carriers leading to reduced volume of the drying chamber.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein:

FIG. 2 is a perspective view of a conical-cylindrical drying chamber equipped with one outlet powder discharging pipe;

FIG. 3 is a perspective view of a conical-cylindrical drying chamber equipped with two outlet powder discharging pipes;

DETAILED DESCRIPTION OF THE INVENTION

Figure 1:
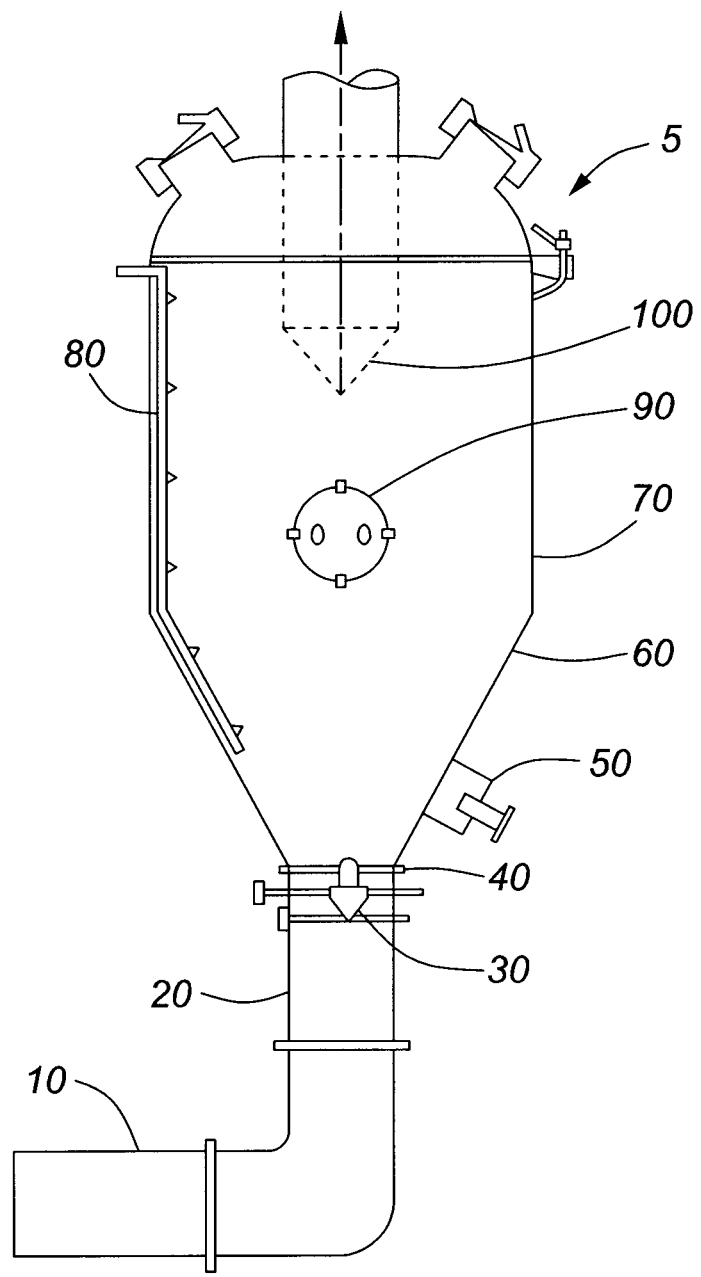
FIG. 1 is a schematic view of the conical-cylindrical drying chamber disclosed in the present invention.
Figure 4A:
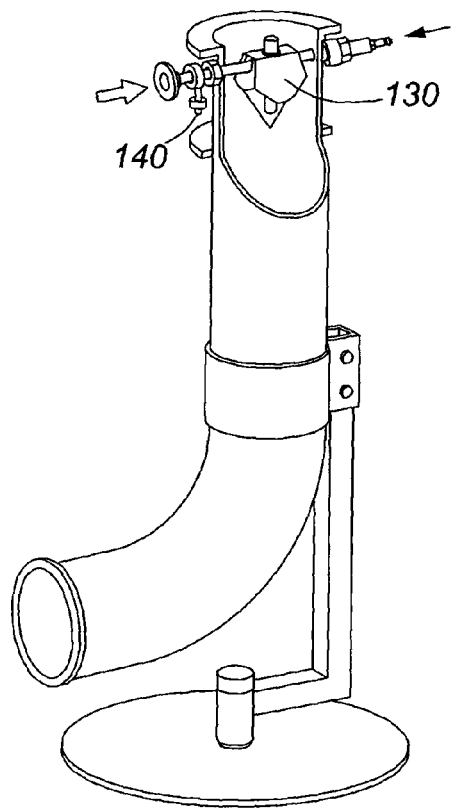
FIG. 4a is an exploded side view showing the details of removable and adjustable atomizing device.
Figure 4B:
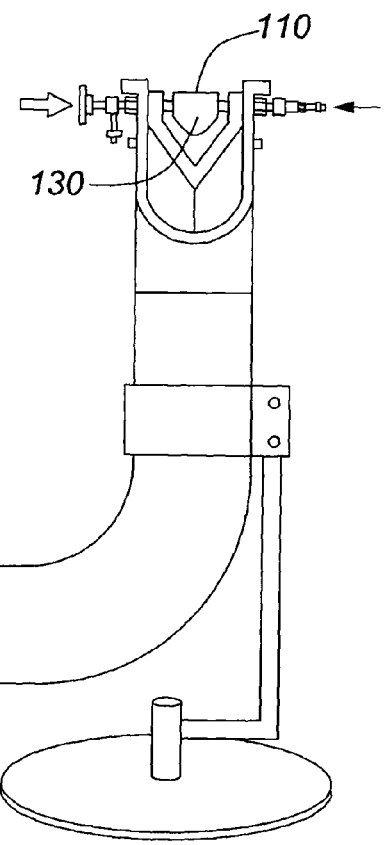
FIG. 4b is an exploded side view showing the details of removable and adjustable atomizing device.
Figure 4C:
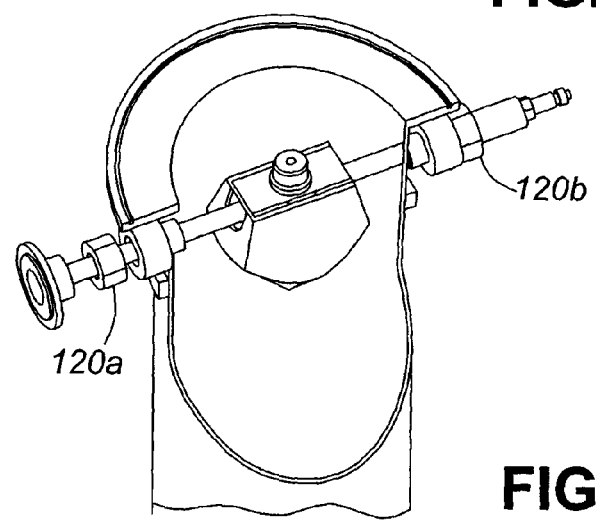
FIG. 4c is an exploded top view showing the details of removable and adjustable atomizing device.
Figure 5:
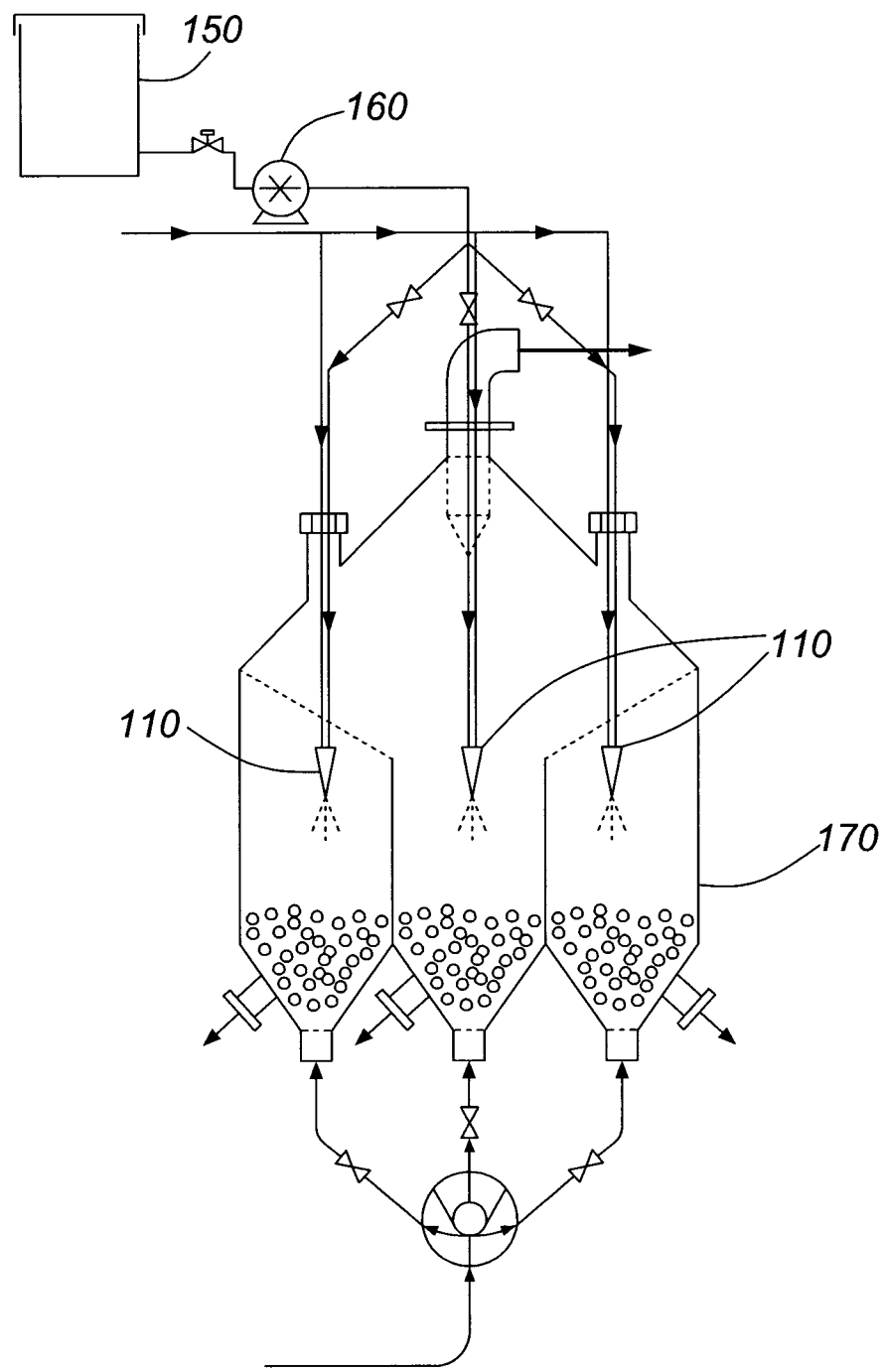
FIG. 5 is a schematic view of a conical-cylindrical drying chamber consisting of three conical-cylindrical compartments with adjustable atomizing nozzles installed at the top of each drying compartment.
Figure 6:
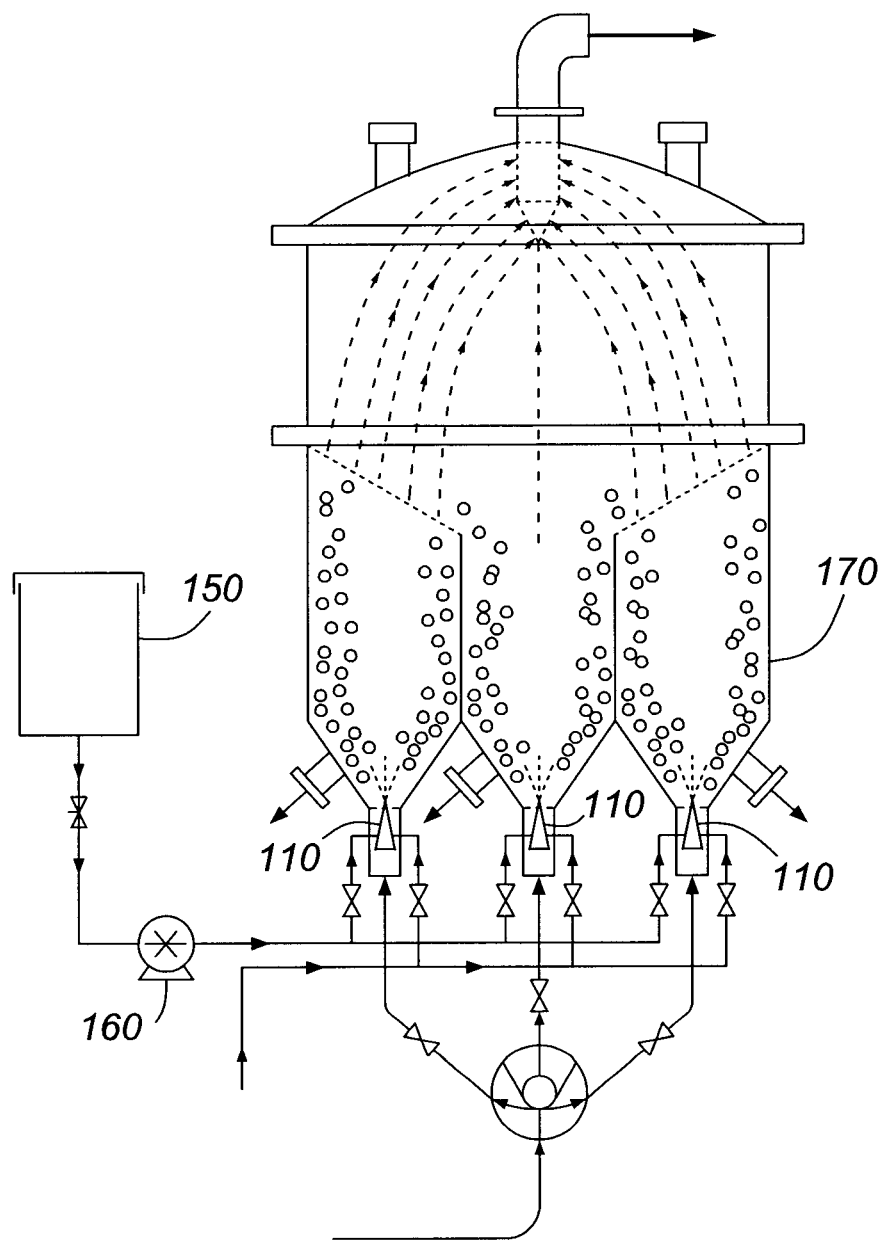
FIG. 6 is a schematic view of a conical-cylindrical drying chamber consisting of three conical-cylindrical compartments with adjustable atomizing nozzles installed at the bottom of each drying compartment.
Figure 7:
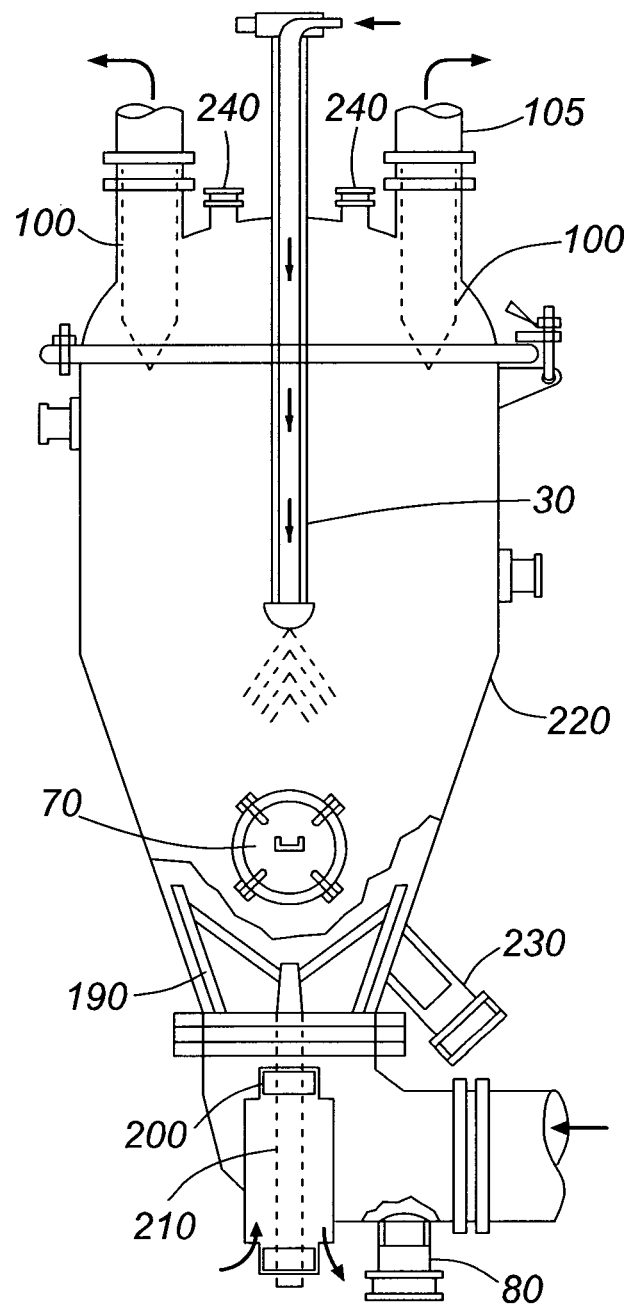
FIG. 7 is a schematic view of a conical-cylindrical drying chamber with a drainage pipe, a stirrer in the shape of reverse truncated cone.

The system disclosed in the present invention for a continuous processing of liquid solutions, suspensions or dispersions may comprise the following elements:

1) A feeding reservoir for supplying homogenous liquid composition;

2) A pumping device for increasing fluid energy of the liquid composition;

3) An atomizing device comprising:
  (a) two-fluid nozzle fitted at its bottom with its inherent part in the shape of a truncated cone to efficiently distribute the upward gaseous drying medium over the nozzle;
  (b) a cylindrical plenum chamber wherein the two-fluid nozzle is located;
  (c) a micrometric tool (or micro-adjustment set-up) attached to the atomizing device to adjust the vertical position of the two-fluid nozzle;
  (d) at least two lateral streamlined tube-like devices for accelerating and directing the atomizing fluid and the liquid suspension in two opposite directions; and
  (e) an accelerating zone of a drying medium consisting of a cylindrical pipe, preferably made from polished stainless steel, located at the bottom of the cylindrical plenum and having a length equivalent to at least five times the diameter of the inlet of the said cylindrical plenum chamber; and 4) A conical-cylindrical drying chamber containing a drying medium and equipped with a manhole, a multi-nozzle manifold and optionally removable insulation panels.

The conical-cylindrical drying chamber should sustain a temperature of a gaseous drying medium of at least 250° C.

For drying and powdering food products, the system is equipped with a drying medium consisting of a single bed or multi-beds of inert carriers aimed at reducing the volume of the drying chamber.

The present invention will now be described with reference to the accompanying drawings, in which some, but not all embodiments of the invention are shown.

The liquid solutions, suspensions or dispersions are preheated to the desired temperature but not more than 35° C.

Two types of the pre-processing step of the liquid solutions, suspensions or dispersions may be considered: When the liquid solutions, suspensions or dispersions are thixotropic (i.e., gel-like), they are difficult to be pumped into the drying chamber. Therefore, a motorized mechanical agitation device is used to convert them into a fluid state. When the liquid solutions, suspensions or dispersions contain any carbohydrate whose molecules consist of a number of monosaccharide components or their simple derivatives bonded together in a long chain-like structure of high molecular weight, an enzymatic treatment is used to break this structure into substances with lower molecular weight.

The resulted liquid solutions, suspensions or dispersions are then fed to the drying chamber through an adjustable atomizing device to generate fine droplets, forming a thin coat on the hot inert carrier surfaces being inherent in the present invention and then dried and powderized. A wire-mesh conical-cylindrical screen is installed at the outlet of the drying chamber to discharge the powdered product while preventing the entrainment of the inert carriers.

FIG. 1 presents a schematic view of a system 5 disclosed in the present invention, including an expansion flexible joint 10, a gas accelerating pipe 20, a removable atomizing device 30, a circular grid 40 to support the bed of inert carriers, a discharge pipe 50 equipped with a removable plug to take out the inert carriers, a conical drying chamber 60 connected with a cylindrical discharging chamber 70 equipped with a multi-compressed air nozzle manifold 80 which can be stationary, or rotated continuously or intermittently, to prevent the deterioration of the hydrodynamics and the drying performance due to a possible build-up of the solid deposit on the inner walls of the drying chamber, the conical-cylindrical discharging chamber 70 also equipped with a manhole 90, a wire-mesh conical-cylindrical screen 100 to discharge the powder while preventing the entrainment of the inert carries.

System 5 may have a dome-shaped cover and at least one outlet discharging pipe.

The configuration, construction and operation of the system 5 can be provided in accordance with the above description in association with the good practice known to a person skilled in the art.

The dome-shaped cover may be equipped with removable glass windows, for example, borosilicate glasses, mounted on a stub-pipe, or a flanged outlet pipe. The outer walls of the drying chamber may be further lined with removable insulation panels (not shown) to avoid heat losses.

FIG. 2 is an embodiment with the conical-cylindrical drying chamber equipped with one outlet powder discharging pipe 105.

FIG. 3 is an embodiment with the conical-cylindrical drying chamber equipped with two outlet powder discharging pipes 105 in order to enhance the discharging capacity.

A person skilled in the art would appreciate that various options and combinations for the number and shape of discharging pipes could be used.

FIGS. 4*a* and 4*b* and 4*c* illustrate the details of removable and adjustable atomizing device 30. Atomizing device 30 may comprise a gas plenum chamber, a two-fluid nozzle 110, a streamlined tube-like device 120*a* herein liquid solutions, suspensions or dispersions are directed to the liquid inlet orifice of the nozzle, a streamlined tube-like device 120*b* wherein the compressed air is flowing at a pressure of more than 275.79 Kilo Pascal and less than 675.69 Kilo Pascal, and a truncated cone 130.

The so-called "truncated cone" body is a solid frustum of pyramid surmounted by a parallelepiped with chamfered faces. These two parts are assembled with a dowel made of stainless steel or polytetrafluroethylene (PTFE) or any equivalent material which can sustain high and frequent heat shocks. It provides a uniform distribution of upward drying medium stream across the annulus between the nozzle and the gas accelerating pipe.

The body of the truncated cone 130 may be made of materials with a low thermal conductivity, a low coefficient of volumetric thermal expansion, and sufficient mechanical resistance, such as PTFE or any equivalent material, to prevent the momentum and heat losses of the upward gaseous drying medium over the two-fluid nozzle.

The atomizing device 30 may optionally be equipped with a micrometric tool or micro-adjustment set-up 140 to move up or down the two-fluid nozzle.

A person skilled in the art would appreciate that various other options and combinations for the atomizing device 30 with two-fluid nozzle may be engaged for system 5.

FIG. 5 illustrates an embodiment of the present invention comprising a feeding reservoir 150 of the liquid solutions, suspensions or dispersions, a positive displacement pump 160, a series of atomizing devices 30 (for example, three) with adjustable atomizing nozzles 110 installed at the top of each drying compartment, a series of motorized valves at the inlet of each of streamlined tube-like devices 120, a drying chamber 170 consisting of three conical-cylindrical compartments, a sealed gas plenum chamber with inner walls divided into three sections to feed uniformly each drying chamber compartment.

An emptying pipe may be disposed in lateral side of the conical part of each drying chamber compartment with an angle equivalent to the slip angle of the inert carriers.

FIG. 6 illustrates an embodiment of the present invention comprising a feeding reservoir 150 of the liquid solutions, suspensions or dispersions, a positive displacement pump 160, a series of three adjustable atomizing nozzles 110 installed at the bottom of each drying compartment, a series of motorized valves at the inlet of each of streamlined tube-like devices 120, a drying chamber 170 consisting of three conical-cylindrical compartments, a sealed gas plenum chamber with inner walls divided into three sections to feed uniformly each drying chamber compartment, an emptying pipe disposed in the lateral side of the conical part of each drying chamber compartment with an angle equivalent to the slip angle of the inert carriers.

Because of specific hydrodynamics and particularities of the drying mechanism on inert carriers, the volume of the drying chamber is limited, the use of multiple conical-cylindrical drying chambers allows an increase of the processing capacity and, consequently, the productivity of the dryer.

FIG. 7 illustrates an embodiment of the present invention further comprising a drainage pipe 180, a stirrer 190 in the shape of reverse truncated cone operated with a motor and high temperature bearings 200 and a cooling jacket 210 to avoid any thermal expansion of the bearings, a conical-cylindrical drying chamber 220 equipped with a manhole 70, a circular grid to support the bed of inert carriers, an emptying pipe equipped with removable plug 230 to discharge the inert carriers, an adjustable vertical atomizing device 30 which can be stationary or rotated continuously or intermittently, two outlet discharging pipes 105 equipped with a wire-mesh conical-cylindrical screen 100 to discharge the powder while preventing the entrainment of the inert carries, a dome-shaped cover equipped with borosilicate glasses 240 mounted on a stub-pipe.

Again, the outer walls of the drying chamber may be lined with removable insulation panels to avoid heat losses.

During continuous dryer operation, up to 10% of used inert carriers can be continuously or intermittently taken out of the dryer, cleaned in a separate device and returned back to the dryer.

For the present invention, the inert carriers are in the shape of full spherical beads or hollow spherical beads, or a mix of both. Spherical shape allows uniform drying of the liquid coat on the beads, whereas the liquid coat deposited on the inert carriers resembling cubes or cylinders will dry faster on the edges and the corners, which will lead to uneven heating, leaving dry material on the plains of the inert carriers but over dried (i.e., overheated) material on the edges and corners. The majority of heat-sensitive materials (e.g., functional foods, nutraceuticals, natural health ingredients, etc.) can be denaturized or thermally deteriorated.

The inert carriers serve as a heat and mass transport aid during the drying and the powderizing process.

The inert carriers may be in the shape of full spherical beads or hollow spherical beads or a mix of both, and may be composed of a mixture of fine and coarse PTFE spherical beads of sizes varying from 3 to 8 mm or titanium oxide spherical beads of size not greater than 2.5 mm. The size of inert carriers is of importance for the performance of the drying and powderizing process. Higher size than the limits provided herein will not allow spouting of inert carriers or will require unacceptable flow rates of gaseous drying medium, leading to excessive energy requirements, energy losses and oversized equipments (e.g., fans, filters, heater, etc).

Figure 8:
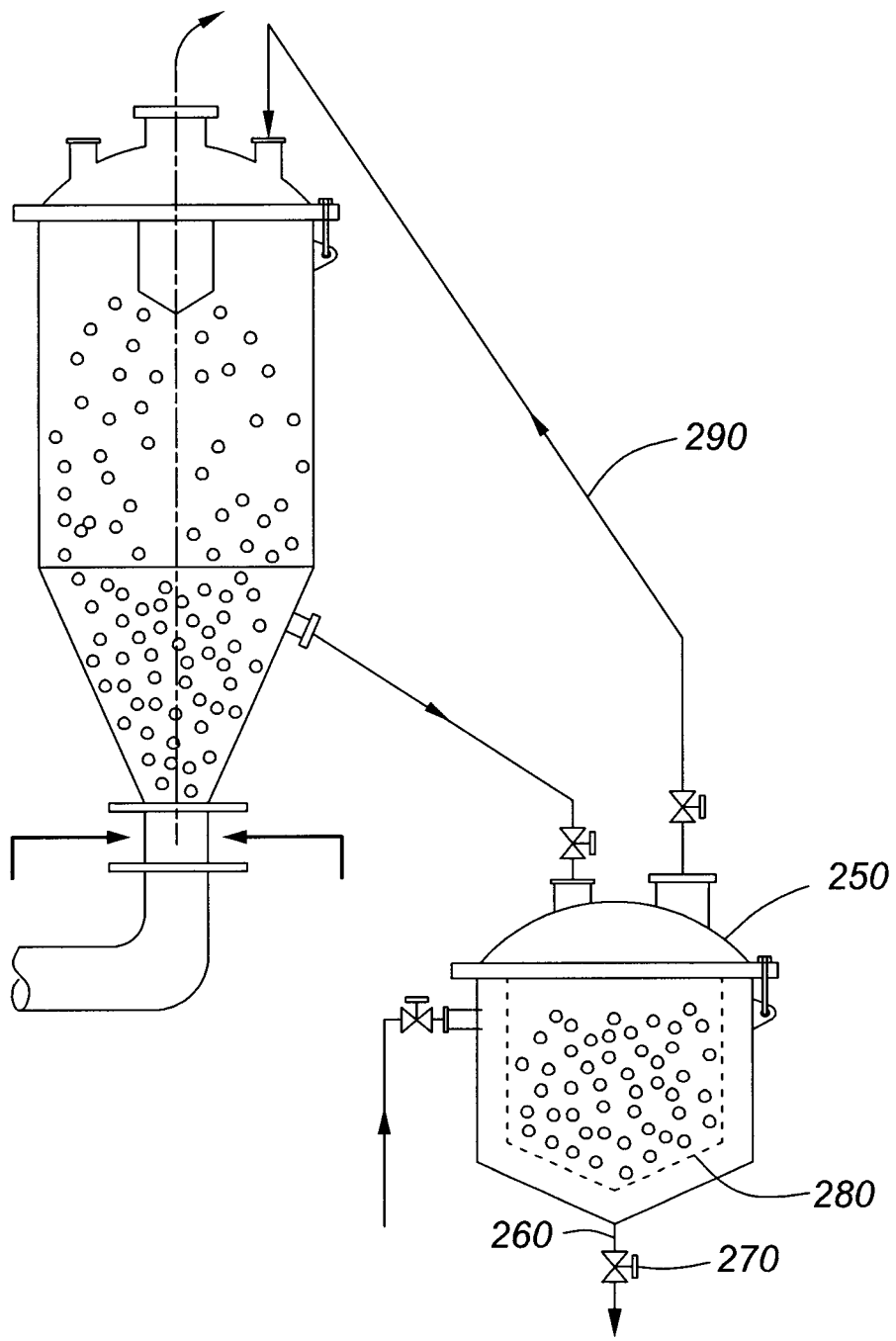
FIG. 8 is a schematic view of a conical-cylindrical drying chamber operated in a closed loop for recycling of the inert heat carriers.

FIG. 8 illustrates an embodiment of the present invention, in a closed loop for additional recycling of the inert heat carriers, comprising: a closed tank 250 containing water and chemical reagents to clean and remove any coat residuals or possible active microorganism from the surface of the inert carriers; a pipe 260 with a motorized valve 270 installed at the bottom of the closed tank to dump the water; a wire-mesh basket 280, which may be made of stainless steel or any equivalent sanitary material, for the used inert carriers to be recovered from the drying chamber; a recycling pipe 290 to transport the cleaned inert carriers from the wire-mesh basket to the drying chamber.

The system may optionally be equipped with a device for separating the powdery product from the gaseous drying medium consisting of a cyclone-type separator or a vortex tube-type separator or a combination thereof.

For example, a cyclone-type separator equipped with a truncated cone vortex stabilizer connected to a sanitary filtering device may be installed at the outlet of the drying chamber for separating the powdery product from the gaseous drying medium and recovering it into the collector.

Cyclone and filtering devices are standard equipments/apparatus used to control particulate emissions. They are commonly used as primary separators, pre-cleaners to reduce solids loading or as classifiers to separate incoming dust in various size fractions. In the present invention, the design of the cyclone integrates a truncated cone vortex stabilizer which allows a homogeneous migration of the particles toward the inner walls of the cyclone and a uniform discharge of particles, and minimizes the carryover of some particles during their movement downward the conical section through the vortex induced within the cyclone.

Figure 9A:
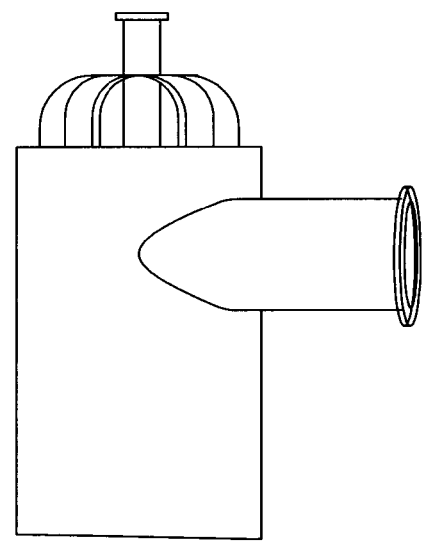
FIG. 9a is a side perspective view of a sanitary filtering device.
Figure 9B:
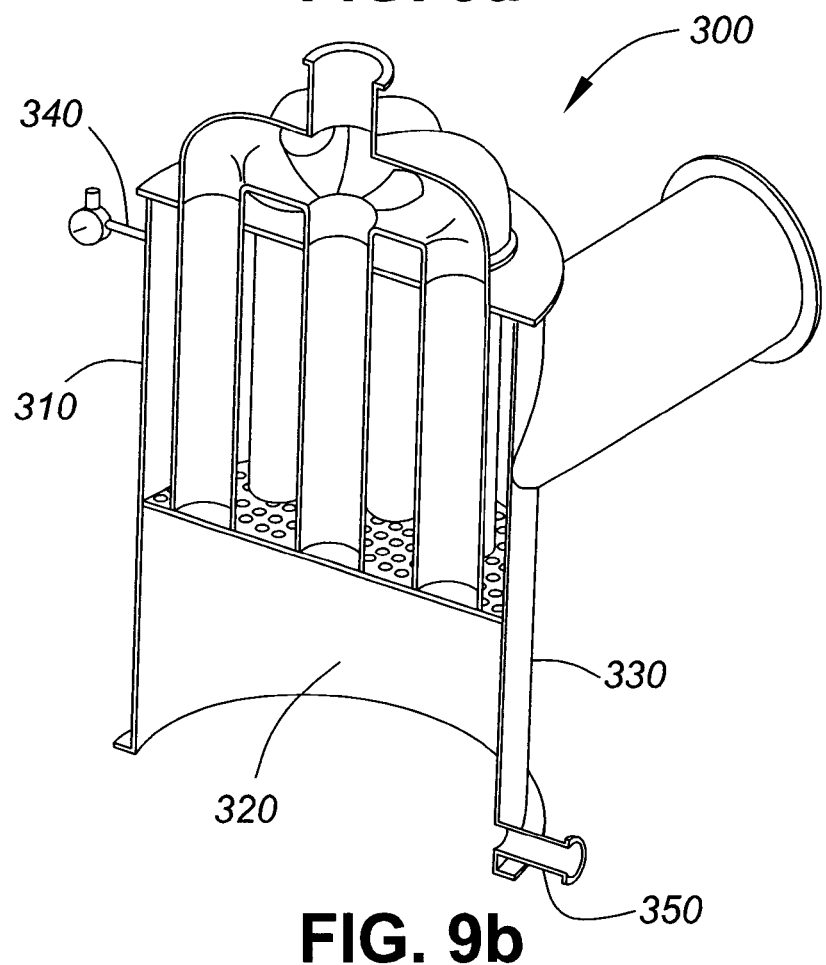
FIG. 9b is an exploded perspective view of a sanitary filtering device.

The design of the sanitary filtering device is shown in FIGS. 9a and 9b. The sanitary filtering device is of modular type and provides a flexible maintenance. The design prevents continuously the clogging of the filtering surfaces due to possible cohesiveness of fine particles, and controls dust emissions with particles even less than 5 microns in size. The sanitary filtering device 300 is composed of multi-filters 310 located vertically in the housing 320 supported by a grid 330 at their bottom, a plurality of jet pulsing nozzles 340 for cleaning of clogged filter surfaces to ensure that the powder is removed from every part of the filter and to prevent the clogging of the filters which minimizes the maintenance cost.

The sanitary filtering device 300 may further be equipped with a suction head 350 connected to a powder collector, and a cleaning-in-place device comprising a series of downpipe rinsing devices equipped with clip-on spray balls generating a cleaning liquid spray with an angle varying from 180° to 360°, a relief valve, and an outlet pipe assembled tangentially to blowout the gaseous drying medium.

Although the present invention has been described in considerable detail with reference to certain preferred embodiments thereof, other embodiments and modifications are possible. Therefore, the scope of the appended claims should not be limited by the preferred embodiments set forth in the examples, but should be given the broadest interpretation consistent with the description as a whole.

I claim:

1. A system for producing free-flowing powder with a narrow particle size distribution from liquid solutions or liquid suspensions or liquid dispersions of functional foods, nutraceuticals, and natural health ingredients comprising in combination:
   (a) a feeding reservoir equipped with an agitator to maintain homogenous liquid compositions of said liquid solutions or liquid suspensions or liquid dispersions;
   (b) a positive displacement pumping device to pump said liquid composition into at least one atomizing device;
   (c) said at least one atomizing device composed of:
      (i) at least one fluid nozzle fitted at its bottom with a body in the shape of a truncated cone to distribute an upward gaseous drying medium over said nozzle;
      (ii) at least two lateral streamlined tube-like devices for directing said fluid or liquid suspensions, and compressed air flow at a pressure of more than 275.79 Kilo Pascal and less than 675.69 Kilo Pascal, respectively;
      (iii) a cylindrical plenum chamber wherein the fluid nozzle is located;
      (iv) an accelerating zone of a drying medium consisting of a cylindrical pipe located at the bottom of the cylindrical plenum and having a length equivalent to at least five times a diameter of said cylindrical plenum chamber;
   (d) a conical-cylindrical drying chamber sustaining a temperature of gaseous drying medium at 250° C. and above equipped with a manhole, and a multi-nozzle manifold;
   (e) an intermediate drying medium consisting of a single bed or multi-beds of inert carriers leading to reduced volume of the drying chamber.

2. The system according to claim 1, wherein the inert carriers are in the shape of full spherical beads or hollow spherical beads, or a mix of both.

3. The system according to claim 2 wherein the inert carriers are composed of a mix of fine and coarse polytetrafluroethylene spherical beads of size varying from 3 to 8 mm or titanium oxide spherical beads of size less than 2.5 mm.

4. The system according to claim 1 further comprising a dome-shape cover equipped with at least one outlet discharging pipe.

5. The system according to claim 1 further comprising a device for separating powdery product from the gaseous drying medium consisting of a cyclone-type separator or a vortex tube-type separator or a combination thereof.

6. The system according to claim 1 further comprising a sanitary filtering device.

7. The system according to claim 1 wherein the multi-nozzle manifold is mounted in a such way that it can be either stationary or rotating continuously or intermittently within the drying chamber to prevent deterioration of the hydrodynamics and the drying performance due to a possible solids build-up on the internal walls of the drying chamber.

8. The system according to claim 1 wherein the gaseous drying medium is a hot dry air, hot carbon dioxide or hot nitrogen, or a combination of at least two of them.

9. The system according to claim 1 wherein the drying chamber is composed of at least one conical cylindrical compartment to enhance the processing capacity and the powderizing productivity.

10. The system according to claim 9, wherein a gas plenum chamber is disposed beneath and in a sealed manner with walls of the at least one conical cylindrical compartment.

11. The system according to claim 9 wherein internal walls of the gas plenum chamber are divided into sections to feed uniformly each said at least one conical cylindrical compartment.

12. The system according to claim 1 wherein an emptying pipe is disposed in lateral side of the conical part of each drying chamber with an angle equivalent to a slip angle of the inert carriers.

13. The system according to claim 1 wherein the at least one atomizing device is installed at the top or at the bottom of each drying chamber.

14. The system according to claim 1 further comprising a closed tank containing water and chemical reagents to clean and remove any remaining coat or possible active microorganism from the surface of the inert carriers.

15. The system according to claim 1 wherein a stirrer in the shape of reverse truncated cone is inserted at the bottom of conical-cylindrical drying chamber to maintain a continuous and organized flow of the inert carriers in the most humid zone located at the bottom of the conical-cylindrical drying chamber.

16. The system according to claim 1, wherein the at least one atomizing device further comprising a micrometric tool to vertically adjust position of the at least one fluid nozzle.

17. The system according to claim 1, wherein the conical-cylindrical drying chamber is further equipped with removable insulation panels.

18. The system according to claim 1, wherein the at least one atomizing device is removable and adjustable.

* * * * *